May 30, 1961 C. L. PETERS 2,985,948

METHOD OF ASSEMBLING A MATRIX OF MAGNETIC CORES

Filed Jan. 14, 1955 4 Sheets-Sheet 1

INVENTOR.
Carl L. Peters
BY Morris L. Rabkin
ATTORNEY.

May 30, 1961 C. L. PETERS 2,985,948

METHOD OF ASSEMBLING A MATRIX OF MAGNETIC CORES

Filed Jan. 14, 1955 4 Sheets-Sheet 2

INVENTOR.
Carl L. Peters
BY Morris Rabkin
ATTORNEY.

May 30, 1961 C. L. PETERS 2,985,948

METHOD OF ASSEMBLING A MATRIX OF MAGNETIC CORES

Filed Jan. 14, 1955

4 Sheets-Sheet 3

INVENTOR.

Carl L. Peters

BY Morris L. Rabkin

ATTORNEY.

May 30, 1961 C. L. PETERS 2,985,948

METHOD OF ASSEMBLING A MATRIX OF MAGNETIC CORES

Filed Jan. 14, 1955 4 Sheets-Sheet 4

INVENTOR.

Carl L. Peters

BY Morris [signature]

ATTORNEY.

United States Patent Office 2,985,948
Patented May 30, 1961

2,985,948

METHOD OF ASSEMBLING A MATRIX OF MAGNETIC CORES

Carl L. Peters, Medford, N.J., assignor to Radio Corporation of America, a corporation of Delaware Filed Jan. 14, 1955, Ser. No. 481,839
8 Claims. (Cl. 29—155.5)

This invention relates to magnetic core matrices and methods of assembling magnetic core matrices. Magnetic core matrices, for example, magnetic matrix memories, are known which consist of a plurality of magnetic cores mounted by addressing wires in columns and rows to form different arrays. The cores are threaded by a single reading wire which couples all cores to provide a readout signal. Close core spacing is required to maintain the length of this reading wire at a minimum. This close spacing of the cores as well as their small size render them very difficult to "string." Likewise, the close core spacing makes termination of the parallel row and column wires very difficult.

The difficulty of constructing matrices by the present manual methods has been commented upon by Rajchman in his article entitled "Myriabit Magnetic-Core Matrix Memory" published in "Proceedings of the I. R. E.," volume 41, number 10, as follows: "the brute force wiring of the myriabit array taxes the patience of a person for six weeks." In addition to the time factor, manual methods require physical handling of the cores, sometimes with microtooling. This handling, at best, is undesirable since undue pressures may change the magnetic characteristics of the cores.

Accordingly, an object of this invention is to provide a novel method of assembling magnetic matrices which method is faster than those heretofore known.

An additional object of this invention is to provide a novel method for constructing magnetic core matrices which method requires a minimum amount of handling of the cores.

A further object of this invention is to provide a novel method of assembling magnetic matrix memories by simpler techniques than those heretofore known.

Still another object of this invention is to provide a novel semi-automatic method for constructing magnetic core matrices which method aids in accurate positioning of the magnetic cores.

Another object of this invention is to provide a novel type of matrix frame construction which frame provides for close core spacing.

Another object of this invention is to provide a novel type of matrix frame construction which frame provides easily accessible terminals.

These and other objects of the invention are achieved in the preferred method according to the invention by accurately positioning the cores as by placing them edgewise in a jig, for example, a slotted index plate. The cores are then picked up by a pressure sensitive tape, as by placing the tape on the index plate with the adhesive side against the cores. A plastic support block may be utilized as a support for the pressure sensitive tape. The tape is lifted away from the index plate and turned over. The cores now adhere to the adhesive material on the support block. The cores may now be sprayed with lacquer or the like to affix them in their relative positions suitable for threading. A matrix frame is placed over the support block. The row and column wires are then threaded, that is, woven in the desired fashion through the cores and terminated on the matrix frame in a desired manner. The block and lacquer may then be removed.

Further, according to the invention, close core spacing and thus a short length reading wire are achieved by mounting the core within an inner frame of a double frame matrix. The outer frame then provides adequate space for terminating matrix wires and making connections thereto.

The novel features of this invention as well as the invention itself, both as to its organization and method of operation, will best be understood from the following description when read in connection with the accompanying drawings in which like reference numerals refer to like parts, in which.

Figure 1:
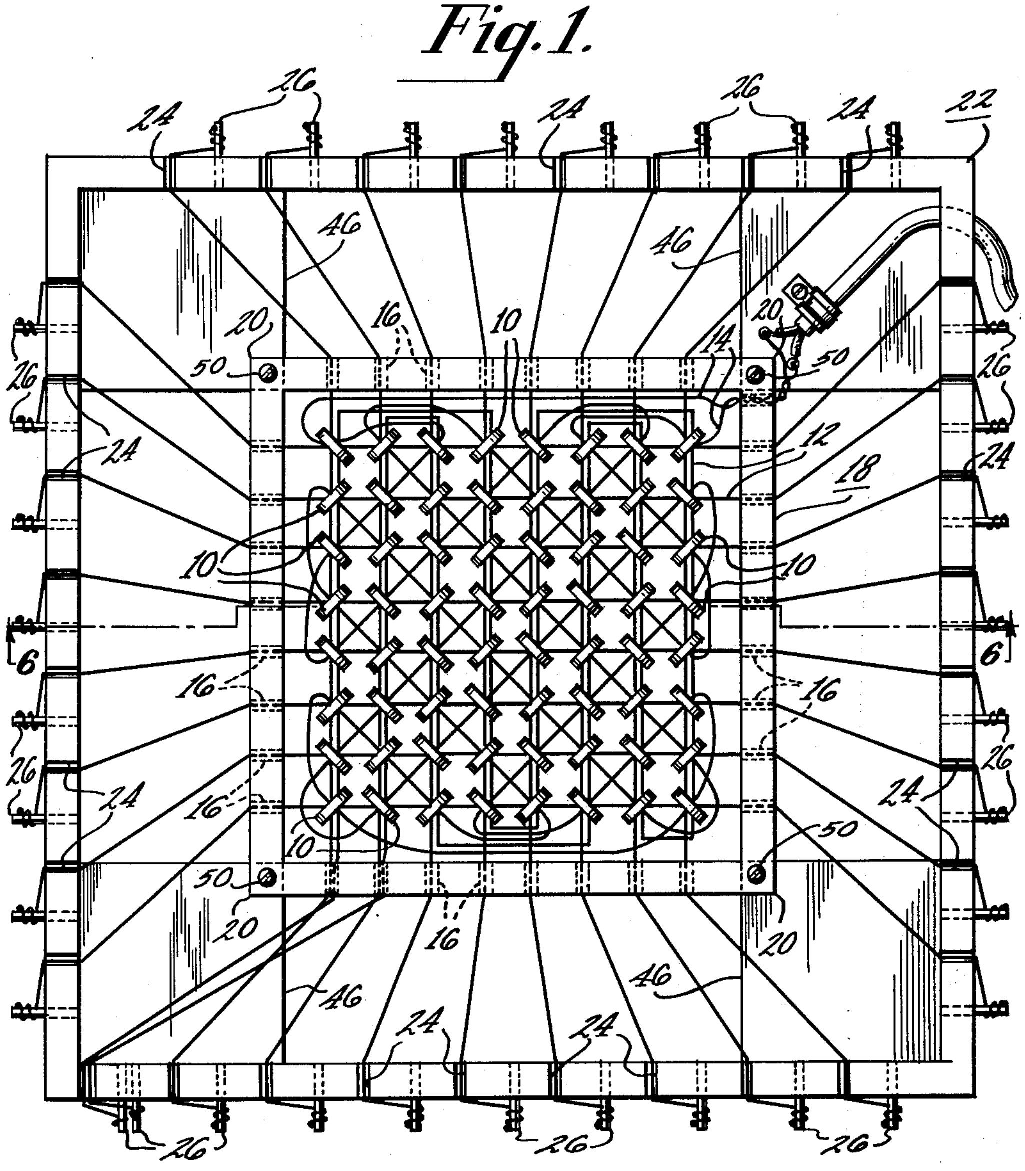
Figure 1 illustrates a plan view of a magnetic core matrix which is in accordance with the invention and which may be assembled by the method taught in this invention.

Referring now to Figure 1, a magnetic core matrix in a double frame is shown. Briefly, the matrix assembly comprises a multitude of toroidal magnetic cores 10, of the type described in the Rajchman article referred to above, held within inner and outer frames 18 and 22. These cores, sometimes referred to as beads, are arrayed in specific geometric patterns. Each core 10 is strung upon and mounted on one or more addressing wires 12 and a reading wire 14. The addressing wires 12 are strung through guide slots 16 in an inner rectangular frame 18 which serves to hold these wires in their proper relative positions. This inner frame 18 is, in turn, mounted at its corners 20 concentrically upon a larger rectangular outer frame 22. The sides of the two frames are parallel. This outer frame 22 is provided with slots 24 and mounting terminals 26 for connecting the several addressing wires 12. The outer frame 22 provides adequate mounting and terminating space for the addressing (often referred to as interrogating) wires 12. On the other hand, the inner frame 18 permits a closely spaced core assembly and minimum length reading wires.

Figure 2A:
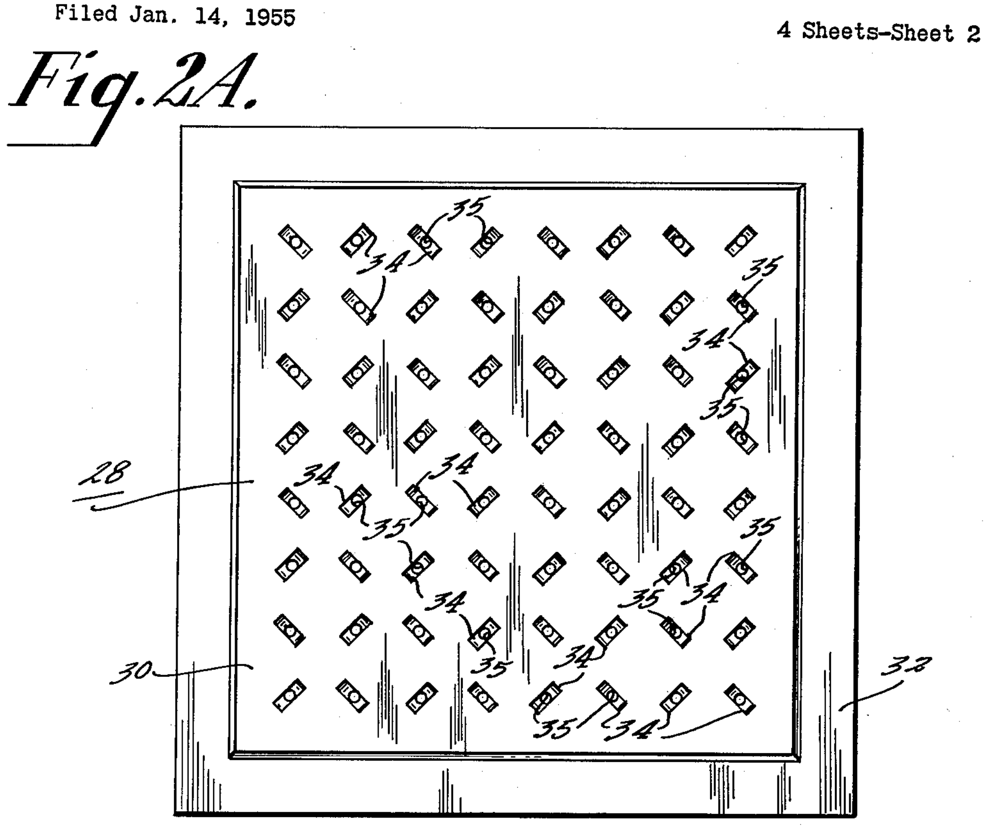
Figure 2A is a plan view of a slotted index plate utilized to accurately position the cores.
Figure 2B:
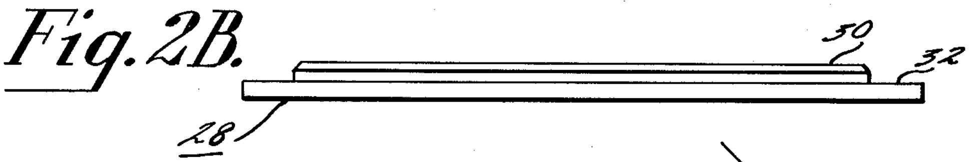
Figure 2B is a side view of the slotted index plate shown in Figure 2A.
Figure 2C:
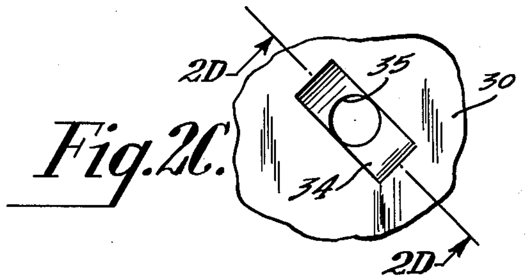
Figure 2C is an enlarged plan view showing only a single slot of Figure 2A.
Figure 2D:
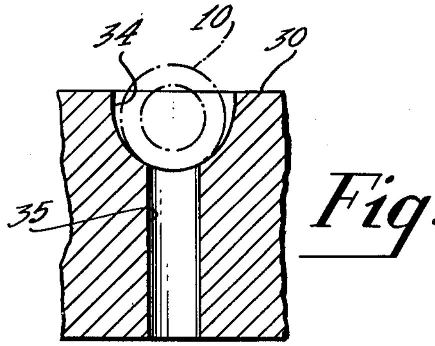
Figure 2D is a cross-sectional view taken along the line 2D—2D of Figure 2C.

The matrix as shown in Figure 1 is assembled according to a preferred embodiment of this invention in a series of unique steps. The presently preferred steps and sequence of steps are set forth as follows:

*Step 1.*—Referring now to the Figures 2A to 2D, the magnetic cores 10 are positioned in individual grooves of an index plate 28 leaving only a portion of each core exposed. This index plate may be made of brass or other suitable material. The index plate is formed with a top surface 30 and a lowered step surface 32. The step surface 32 is employed to assist in accurately positioning the cores 10 within the inner matrix frame 18 as will become more fully apparent from the description below. To this end, the length and width of the top surface 30 are made to correspond to the corresponding inside dimensions of the inner matrix frame 18. A plurality of slots (grooves) 34 are formed in this index plate, each to receive a magnetic core 10. The particular geometric pattern, that is, array, in which these slots 34 are arranged corresponds to the pattern desired for threading the cores in the completed matrix. As shown in Figure 2D, these slots 34 are of sufficient depth to almost completely envelop a magnetic core 10. The length and width of these slots are of such dimensions so as to allow one and only one core to be positioned in any one slot wherein it is accurately positioned.

A hole 35 is provided in the index plate 28 extending through from the rear of the index plate to each one of the slots 34. These holes 35 may be used to remove individual cores by inserting a wire or other suitable device through the hole from the rear of the plate 28. Further, these holes 35 may be employed as air holes through which a vacuum may be applied as a techique for placing the cores 10 in the several slots 34 of the index plate.

Figures 3, 4, 5, 6:
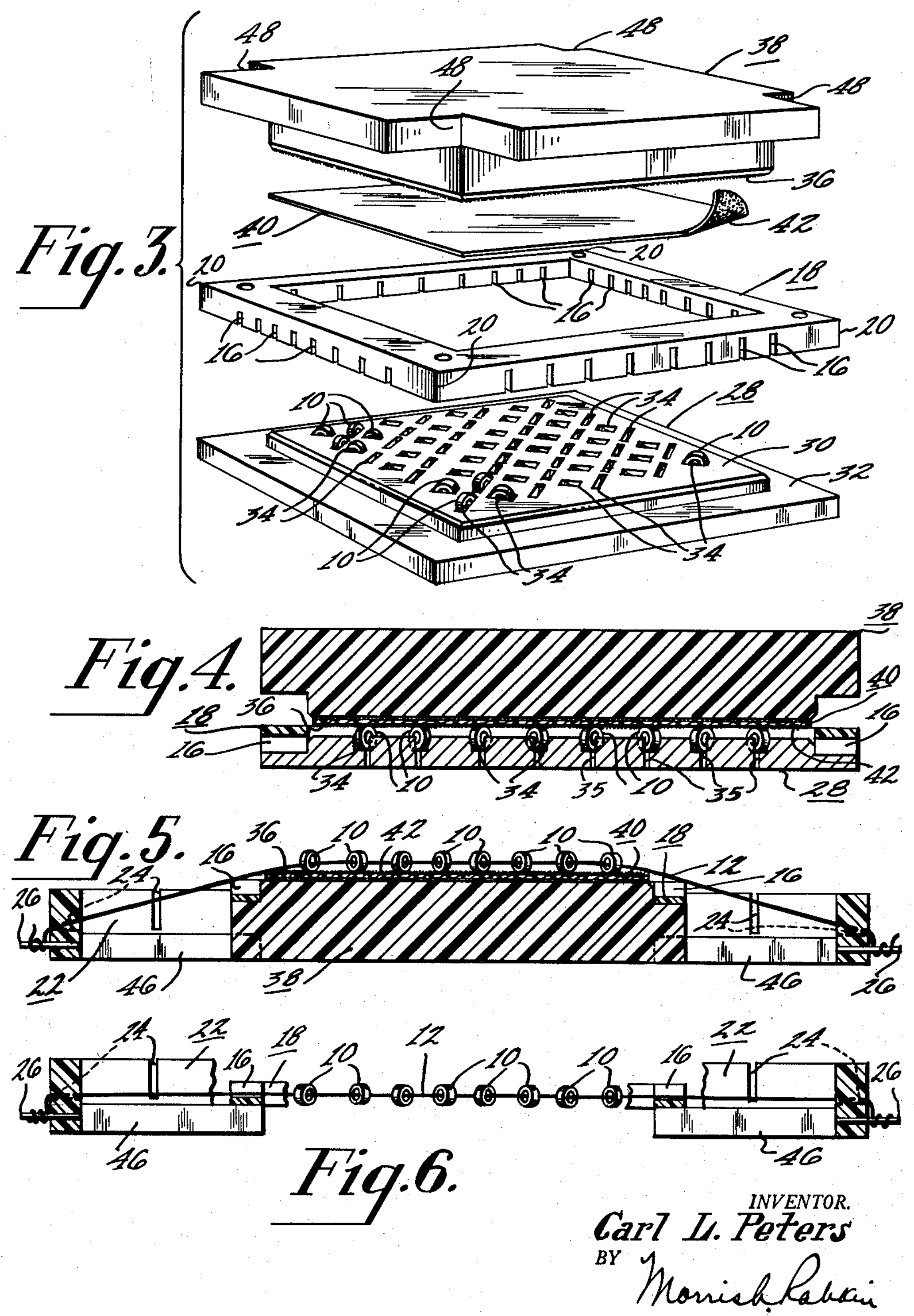
Figure 3 is an exploded view illustrating one of the steps of the process of this invention.
Figure 4 is a cross-sectional view illustrating a step in the method in accordance with this invention wherein the magnetic cores are caused to adhere to the support block.
Figure 5 is a cross-sectional view illustrating the manner in which weaving of the cores is accomplished.
Figure 6 is a cross-sectional view partly cut away of the completed magnetic core matrix taken along line 6—6 of Figure 1.

*Step 2.*—One face 36 of a support block 38, which may be constructed from a thermoset plastic, such as Bakelite (as shown in Figure 3), is covered with a pressure sensitive adhesive tape 40 with one adhesive side 42 (the lower side as viewed in Figure 3) facing away from the block 38. The support block 38 has the same lateral dimensions as the top surface 30 of the index plate 28 to allow the block, or a portion thereof, to fit within the inner matrix frame 18. These dimensions afford accurate positioning of the cores within the inner matrix frame as will become apparent from the description below. This tape 42 may be affixed to the face 36 of the support block 38 by any suitable material, or by adhesive on the side of the tape 40 next to the block 38. For example, commercially available rubber cement is one such type of material which has been successfully utilized. A mechanical type fastening might also be employed to fasten the tape 40 to the block 38. Likewise, any commercially available pressure sensitive tape may serve for the tape 40. Scotch Electrical Tape, No. 9 has been used successfully for the tape 40.

*Step 3.*—The inner matrix frame 18 is placed on the outside step portion 32 of the index plate 28 as indicated by the exploded view of Figure 3 and the sectional view of Figure 4. The support block 38 is then placed with the face 36 down on top of the cores 10 thereby causing the cores to adhere to the tape's adhesive surface 42. By this technique, the inner matrix frame 18 acts to guide the support block 38 to an accurate position over the cores 10. This entire assembly comprising the index plate 28, the inner matrix frame 18, and the support block 38 is then turned over and the index plate 28 removed. This leaves the cores upright and held in their respective positions by the tape 40 on the support block 38.

As an alternative for adhesive tape mounted upon the face of a support block, any adhesive material may be placed upon the face of the support block to serve the same function. In another alternative, a support block (not shown) having air holes at the positions the cores are to be mounted may be employed. By applying a vacuum to each of these air holes the necessary cohesive force is obtained and the cores may be lifted from the index plate ready for further processing as previously described.

*Step 4.*—The cores are then sprayed with lacquer to secure these cores firmly in position to allow weaving. The lacquer may be any of the acrylic resins combined with common lacquer thinner or may be of the nitrocellulose type. A suitable lacquer of the former type is being sold currently under the trade name of "Krylon." Whichever type of lacquer is employed, multiple coats are recommended. For example, four coats of "Krylon" lacquer have been used successfully.

*Step 5.*—Next, the support block 38 holding the cores 10, with the inner frame 18 mounted around the top portion thereof as illustrated in Figure 5, is placed in the center of the outer frame 22. The support block 38 is then loosely positioned by its corner recesses 48 (see also Figure 3) and by the corner blocks 46 (see also Figure 1) of the outer matrix frame 22. In this manner, the cores 10 are now held on the face 36 of the support block 38 in a position elevated above the outer frame 22 to allow unobstructed weaving.

*Step 6.*—The several matrix wires 12 are now woven, that is, strung through the cores 10. In the weaving position, as shown in Figure 5, the wire or wires 12, 14 to be woven through the cores are inserted into a fine, thin walled, nickel tubing (not shown), which serves as the weaving needle. The tubing size is chosen to provide a snug sliding fit for the number of wires to be woven at one time. This snug fit holds the wire in the needle tubing without undesirable crimping or other mechanical means. As each addressing or other wire 12, 14 is woven, the ends are dressed through the proper slots 16, 24 in both the inner and outer frames 18, 22. These wires are then temporarily terminated on the terminals 26 of the outer frame 22.

*Step 7.*—With the weaving complete, the outer frame 22 is raised and fastened (Figure 6) by the corner blocks 46 of the outer frame 22 to each corner 20 of the inner frame 18. Four screws 50 (Figure 1) or other fastening means may be employed.

*Step 8.*—Slack caused by raising the outer frame is then "taken up" and the individual leads 12, 14 dressed to corresponding terminals 26 on the outer frame 22. These edge terminals 26 may then be soldered in four operations by dip soldering.

Figure 7:
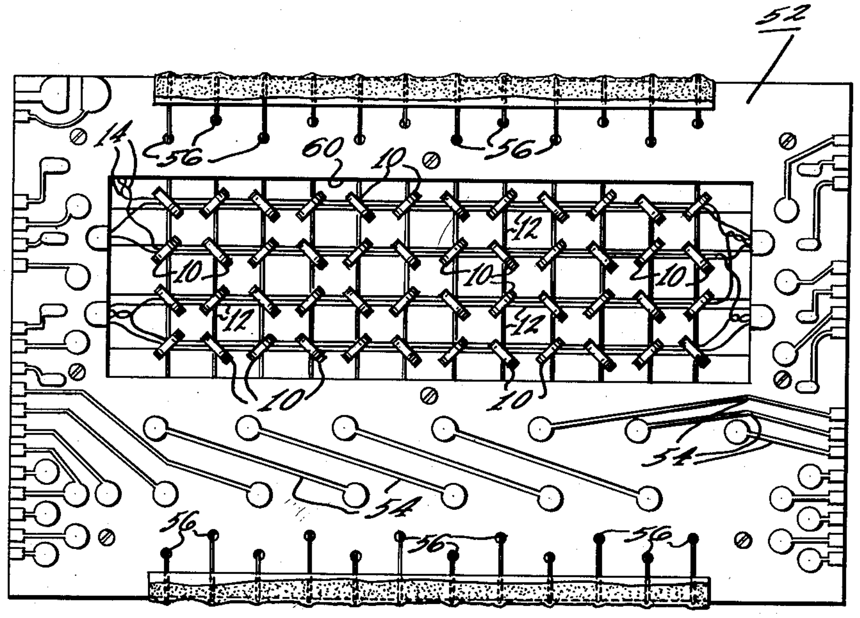
Figure 7 illustrates the front view of a magnetic core matrix assembled within a printed circuit board frame, in accordance with the process disclosed in this invention.

*Step 9.*—As the final step, the support block 38 is removed by flushing the cores 10 with acetone, or other suitable solvents, to dissolve the previously applied lacquer. The cores 10 are now freed from the block 38 and held only by the wires 12, 14 on the frames 18, 22. Thus, there is produced an assembled frame as indicated in Figures 1 and 6. A different frame assembled in accordance with the invention is illustrated by way of example in Figure 7 which shows the employment of a printed circuit board 52 as the matrix frame. In Figure 7, as in Figure 1, the cores 10, wiring 12, 14, and printed circuitry wiring 54 (Figure 7) shown have been illustrated as greatly enlarged. The cores 10, and wiring 12, 14 are located within a cutout portion 60 of the printed circuit board 52. In practice, within a cutout portion of 1½" x 6" more than 1,000 of these magnetic cores may be positioned and wired. Means of making the printed circuit boards need not be described, as any suitable known method may be utilized. In employing a printed circuit matrix frame, the same basic steps of the above described method is followed. Thus, the magnetic cores to be woven are positioned by an index plate. This index plate has suitable dimensions to fit within the cutout area 60. An adhesive surface mounted upon a support block of similar type as that described previously may then be utilized to lift the cores out of the index plate, to serve after receiving several coats of lacquer or other binder as the weaving block. The printed circuit board is positioned with the cutaway portion over the support block. The cores are woven. The weaving wires are then inserted through preformed holes 56 in the printed circuit board 52 and temporarily terminated. The weaving block is removed, the wires given a final dressing to the terminals and dip soldered as before. Finally, the support block may be removed by the previously described acetone flushing.

As stated above, this proces may also be used to construct any other matrices or similar configurations which employ magnetic cores. For example, this method has proven extremely useful in constructing magnetic switch-core apparatus and circuits.

While an index plate arrangement has been illustrated and described, if the situation arises wherein few cores are required, hand positioning is desirable, or if an index plate is not available, the individual cores may be placed directly on the adhesive tape mounting and sprayed. Also, the other specific pieces of apparatus shown were for usage in the preferred embodiments of this invention and the process herein disclosed is not dependent upon the utilization of any such apparatus. The process herein described may be modified as desired for other matrix types or to achieve certain advantages which will become apparent to the skilled user of this process.

There has hereinabove been shown and described a method for rapidly constructing magnetic core matrices having accurately positioned cores in a manner which requires a minimum amount of handling of the cores themselves. This process is not restricted to any one type of matrix and is equally adaptable to any one of a plurality of core designs. A novel magnetic core matrix has also been shown and described which allows close core spacing, a minimum length reading wire and yet adequate space for terminating the addressing wires and connecting thereto.

What is claimed is:

1. A method of assembling a matrix of magnetic cores comprising the steps of positioning the cores on edge in columns and rows in slots in a core holder, the slots being arranged at substantially 45° to the columns and rows so that the apertures in the cores align in columns and rows; placing over the cores thus positioned a support with an adherent material thereon; separating the support and holder, whereby the cores adhere to the support and retain their original relative positions; applying to the cores and support a second material which firmly secures the cores in their positions on the support; threading column and row wires through the cores thus secured; securing the column and row wires to terminals on a frame placed about the threaded cores; and dissolving both the adherent material and the second material.

2. A method of assembling a matrix of magnetic cores comprising the steps of positioning the cores on edge in columns and rows in slots in a core holder, the slots being arranged at substantially 45° to the columns and rows so that the apertures in the cores are aligned in columns and rows; placing over the cores thus positioned a support with an adherent material thereon; separating the support and holder, whereby the cores adhere to the support in the same relative positions as in the holder; spraying the cores and support with a second material of the type which produces a firm bond between the cores and support; threading column and row wires through the cores thus secured; placing a frame with terminals about the threaded cores; securing the column and row wires to the terminals on the frame; and then dissolving both the adherent material and the second material.

3. A method of assembling a matrix of magnetic cores comprising the steps of positioning the cores on edge in columns and rows in slots in a core holder, the slots being at angles of substantially 45° to the columns and rows so that the apertures in the cores align in columns and rows, and the slots being of a depth such that the holes in the cores are at least partially blocked; placing over the cores thus positioned a support with an adherent material thereon; separating the support and holder, whereby the cores adhere to the support and retain their original relative positions; spraying the cores and support with lacquer so as to firmly secure the cores in position; threading column and row wires through the cores thus secured; placing a frame with terminals about the threaded cores and securing the column and row wires to the terminals; and dissolving both the adherent material and the lacquer.

4. In a method of assembling a matrix of magnetic cores in which the cores are first positioned on edge in rows and columns in slots in a holder, the slots being arranged at substantially 45° to the columns and rows so that the apertures in the cores align in columns and rows, and in which the depth of the slots is such that apertures in the cores are at least partially blocked thereby making it difficult to thread wires through the apertures, the improvement comprising the steps of removing the cores as a group from the holder onto the adherent surface of a supporting base so that the cores are on edge on the surface of the supporting base with their apertures fully exposed and with the cores in the same relative positions with respect to one another; spraying onto the cores and base a substance which produces a firm bond between the cores and base; after the substance has set, threading wires through the aligned apertures in the cores; securing the wires to terminals on a frame placed about the matrix of cores; and dissolving both the adherent material and the substance.

5. In a method of assembling a matrix of magnetic cores, the steps of positioning the cores on edge in rows and columns in slots in a holder by creating a vacuum at each slot so as to draw the cores into the slots, the slots being at angles of substantially 45° to the columns and rows so that the apertures in the cores are aligned in columns and rows, and the slots having a depth such that the apertures in the cores are at least partially blocked thereby making it difficult to thread wires through the apertures; placing over the cores thus positioned a support with an adherent material thereon; separating the support and holder whereby the cores adhere on edge to the support with their apertures fully exposed and with the cores in the same relative positions with respect to one another; spraying onto the cores and support a substance which produces a firm bond between the cores and support; threading column and row wires through the aligned apertures in the cores; securing the wires to terminals on a frame placed about the matrix of threaded cores; and then dissolving the adherent material and the substance and removing the support.

6. A method of assembling a matrix of magnetic cores comprising the steps of positioning the cores on edge in perpendicular columns and rows in slots in a core holder, the slots disposed at angles of approximately 45° from said columns and rows and of a depth such that the holes in the cores are at least partially blocked thereby making it difficult to thread conductors through the apertures; placing an inner frame having conductor guiding slots on the outer margin of the core holder; placing over the positioned cores and the inner frame a support having a recessed seat for said inner frame and an adherent material thereon; turning over the core containing holder, the inner frame, and the support as a unit thereby placing the inner frame in the seat out of the threading plane; separating the support and the inner frame from the holder, whereby the cores adhere to the support and maintain their original relative positions; spraying the cores and support with a substance which firmly secures the cores in said positions; placing an outer frame around the periphery of the support and the inner frame such that said outer frame is out of the threading plane; threading conductors through said guide slots of the inner frame, and through the cores thus secured, to form coplanar column and row windings; securing the conductors to the outer frame; securing the frames together; eliminating slack in the conductors and fastening them to the outer frame; and dissolving both the adherent material and the substance with a solvent to free the threaded cores from the support.

7. In a method of making a magnetic core matrix, the steps of placing apertured magnetic cores as a group on edge on an adherent surface, with the cores arranged in columns and rows and at angles of substantially 45°, edge on, with respect to the columns and rows so that the apertures in the cores are aligned in columns and rows, so as to temporarily hold the cores in place; applying to the cores and surface a substance which produces a firm bond between the cores and surface; threading conductors through the apertures in the cores; securing the conductors to terminals on a frame placed about the threaded cores; and dissolving both the adherent material which temporarily holds the cores in place and the substance which produces the firm bond.

8. In a method of assembling a matrix of magnetic cores, the steps of positioning the cores on edge in rows and columns in slots in a holder with the aid of a vacuum created at each slot, the slots being at angles of substantially 45° to the columns and rows so that the apertures in the cores are aligned in columns and rows, and the slots having a depth such that the apertures in the cores are at least partially blocked thereby making it difficult to thread wires through the apertures; placing over the cores thus positioned a support with an adherent material thereon; separating the support and holder whereby the cores adhere on edge to the support with their apertures fully exposed and with the cores in the same relative positions with respect to one another; threading column and row wires through the aligned apertures in the cores; securing the wires to terminals on a frame placed about the matrix of threaded cores; and then dissolving the adherent material and removing the support.

References Cited in the file of this patent

UNITED STATES PATENTS

| | | |
|---|---|---|
| 1,130,679 | Staunton | Mar. 2, 1915 |
| 1,325,325 | Janke | Dec. 16, 1919 |
| 1,645,941 | Williams | Oct. 18, 1927 |
| 1,988,734 | Helgason | Jan. 22, 1935 |
| 2,226,440 | Parker | Dec. 24, 1940 |
| 2,251,326 | Cullin | Aug. 5, 1941 |
| 2,536,677 | Brunner et al. | Jan. 2, 1951 |
| 2,550,898 | Youngblood et al. | May 1, 1951 |
| 2,573,087 | Youngblood et al. | Oct. 30, 1951 |
| 2,654,142 | Horelick | Oct. 6, 1953 |
| 2,699,424 | Nieter | Jan. 11, 1955 |
| 2,700,150 | Wales | Jan. 18, 1955 |
| 2,712,126 | Rosenberg et al. | June 28, 1955 |
| 2,724,103 | Ashenhurst | Nov. 15, 1955 |
| 2,719,965 | Person | Oct. 4, 1955 |